US010169600B2

(12) United States Patent
Feng et al.

(10) Patent No.: US 10,169,600 B2
(45) Date of Patent: Jan. 1, 2019

(54) ENCRYPTION POLICIES FOR VARIOUS NODES OF A FILE

(71) Applicant: International Business Machines Corporation, Armonk, NY (US)

(72) Inventors: Hao Feng, Beijing (CN); Shuo Li, Beijing (CN); ShengYan Sun, Beijing (CN); Jun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 14/881,315

(22) Filed: Oct. 13, 2015

(65) Prior Publication Data
US 2017/0104762 A1    Apr. 13, 2017

(51) Int. Cl.
*H04L 29/06*        (2006.01)
*G06F 21/62*        (2013.01)

(52) U.S. Cl.
CPC ........ *G06F 21/6218* (2013.01); *H04L 63/105* (2013.01)

(58) Field of Classification Search
CPC combination set(s) only.
See application file for complete search history.

(56) References Cited

U.S. PATENT DOCUMENTS

| | | | |
|---|---|---|---|
| 8,554,749 B2 | 10/2013 | Herbach | |
| 2002/0090090 A1* | 7/2002 | Van Rijnsoever | H04N 7/1675 380/279 |
| 2002/0138845 A1* | 9/2002 | Hoang | H04L 63/10 725/90 |
| 2002/0164079 A1* | 11/2002 | Carau, Sr. | G06F 17/212 382/229 |
| 2003/0110169 A1* | 6/2003 | Zuili | C12N 9/16 |
| 2005/0262575 A1* | 11/2005 | Dweck | H04L 51/00 726/28 |
| 2005/0267750 A1* | 12/2005 | Steuer | H04H 60/37 704/231 |
| 2006/0004686 A1* | 1/2006 | Molnar | G06F 17/30297 |
| 2006/0080538 A1* | 4/2006 | Kusuda | G06T 1/0071 713/176 |
| 2006/0168657 A1* | 7/2006 | Baentsch | H04L 29/06 726/21 |
| 2006/0236104 A1* | 10/2006 | Wong | G06F 21/6227 713/168 |
| 2007/0016802 A1* | 1/2007 | Wingert | H04N 7/1675 713/193 |
| 2007/0038873 A1* | 2/2007 | Oliveira | G06F 21/10 713/193 |
| 2007/0201700 A1* | 8/2007 | Hacigumus | H04L 9/083 380/277 |
| 2008/0033960 A1* | 2/2008 | Banks | G06F 17/30595 |

(Continued)

*Primary Examiner* — Phy Anh T Vu
(74) *Attorney, Agent, or Firm* — James L. Olsen (57) ABSTRACT

A computing device may parse a file into a plurality of nodes. The computing device may associate, based on the parsing, at least a first encryption policy with a first node of the plurality of nodes. The computing device may associate, based on the parsing, at least a second encryption policy with a second node of the plurality of nodes. Data may be encrypted, based on the associating at least the first encryption policy with a first node, within at least the first node. Data may be encrypted, based on the associating at least a second encryption policy with a second node, within at least the second node.

11 Claims, 7 Drawing Sheets

(56) References Cited

U.S. PATENT DOCUMENTS

| | | | |
|---|---|---|---|
| 2008/0279376 A1* | 11/2008 | Jin | G06F 21/10 |
| | | | 380/202 |
| 2008/0281777 A1* | 11/2008 | Sambotin | G06F 11/0763 |
| 2012/0082438 A1* | 4/2012 | Nakao | H04N 5/76 |
| | | | 386/328 |
| 2012/0110680 A1 | 5/2012 | Oliver et al. | |
| 2012/0317145 A1 | 12/2012 | Reghetti et al. | |
| 2015/0039886 A1 | 2/2015 | Kahol et al. | |
| 2016/0292041 A1* | 10/2016 | Bender | G06F 11/1451 |
| 2017/0132429 A1* | 5/2017 | Bell | H04L 9/0861 |

\* cited by examiner

|  | Product A Sales | Product B Sales | Product C Sales | Operating Costs | Variable Costs | Revenue | Profit |
|---|---|---|---|---|---|---|---|
| Site 1 | $100,456. | $300,000. | $200,444. | $100,000. | $250,000. | $600,900. | $250,900. |
| Site 2 | $200,000. | Xy45%& | 9iu>?# | n/}><34j | 4Ji(tJpl>? | 2@7%kzX | {Plq!~tr |
| Site 3 | $50,498. | @HU#34! | Ju(%$4jT | 1j!nP89fj | 1}'jPk89P | 2@7%kzX | F56*08B |
| TOTALS | $350,954. | 9iu>?# | 09X!~jllet | 7&n;k#0# | #jo$4FzT | 0Px$4fjt | %6js;^F89p |

ENCRYPTION POLICIES FOR VARIOUS NODES OF A FILE

BACKGROUND

This disclosure relates generally to file encryption management, and more specifically, to providing encryption policies for various nodes of a file.

A file may include multiple blocks and each block or set of blocks may contain different information. For example, a file may include a set of data blocks that includes data values. The file may further include a set of meta data blocks (e.g., inode blocks) that contains information about the size of the file, the owner of the file and access rights, timestamps, references to where data blocks are (e.g., via pointers), etc. The file may further include another block (e.g., a superblock), which contains information about how many meta data blocks and data blocks are in the file system, where the meta data blocks and data blocks begin, an identifier to identify the type of file system, etc.

Each data block may include various logical data structures. For example, in a database file, a first data block may include a data table. The data table may be a collection of individual records. Each record may be divided into various fields that correspond to various columns or attributes of the table. Each field of the record may include various data values.

SUMMARY

One or more embodiments are directed to a computer-implemented method, a system, and a computer program product for providing encryption policies for various portions of a file. A computing device may parse a file into a plurality of nodes. The computing device may associate, based on the parsing, at least a first encryption policy with a first node of the plurality of nodes. The computing device may associate, based on the parsing, at least a second encryption policy with a second node of the plurality of nodes. Data may be encrypted, based on the associating at least the first encryption policy with a first node, within at least the first node. Data may be encrypted, based on the associating at least a second encryption policy with a second node, within at least the second node.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to providing encryption policies for various nodes of a file. While the present disclosure is not necessarily limited to such applications, various aspects of the disclosure may be appreciated through a discussion of various examples using this context.

Providing file data security has become a great concern for individuals, businesses, and government officials. However, providing categorical data security, such as encrypting an entire file or a portion of a file may be unrealistic given the idiosyncratic needs of all of the individuals who may need to have access to a particular file. For example, a data block of a file may include a database table, which includes several columns. A first column may include data specifically designed for a chief executive officer (CEO) and/or other executive board members to view. A second column may include data specifically designed for a Chief Financial Officer (CFO) to view. Further, a third column may include data specifically designed for managers or other workers to view. Embodiments of the present disclosure are therefore directed to providing encryption policies for various portions of a file by parsing a file into a plurality of nodes, associating one or more encryption policies with each of the plurality of nodes, and encrypting, based on the associating, data within at least one of the plurality of nodes.

Figure 1:
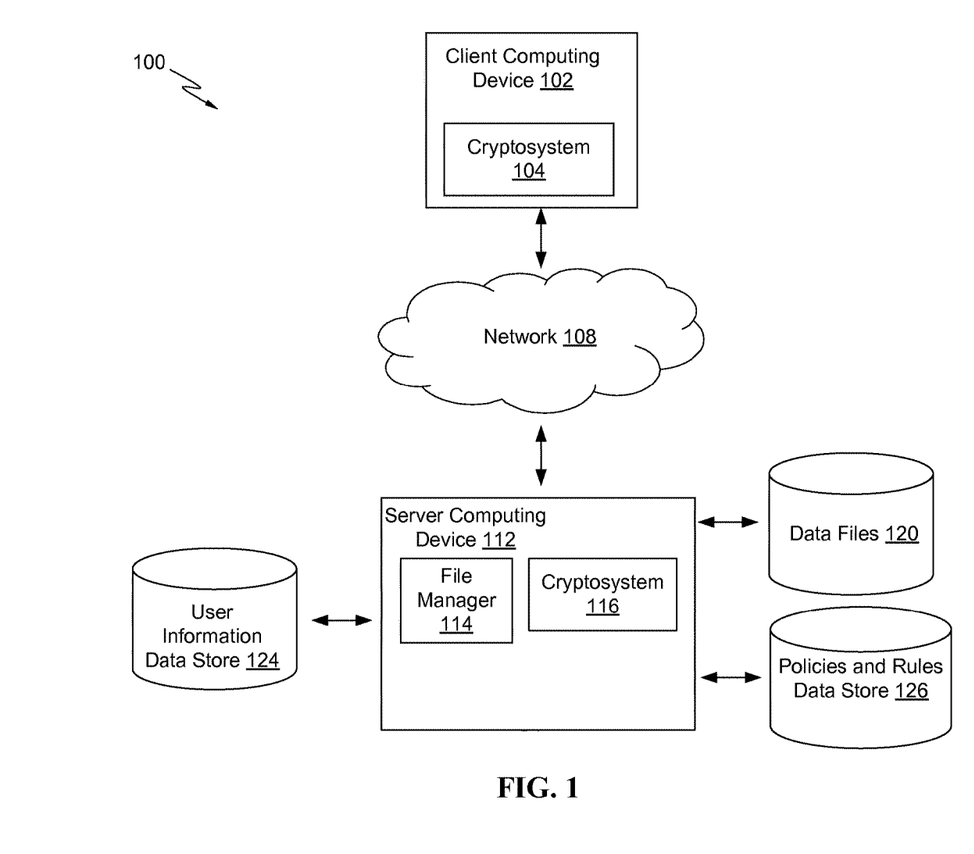
FIG. 1 is a block diagram of a computing environment, according to embodiments.

FIG. 1 is a block diagram of a computing environment 100, according to embodiments. The computing environment 100 may include a client computing device 102, one or more server computing devices, such as server computing device 112, and a network 108. In some embodiments, the server computing device 112 may have access to various data files 120, a user information data store 124 (e.g., database), and a policies and rules data store 126, as described in more detail below. In some embodiments, the computing environment 100 may be implemented within a cloud computing environment, or using one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 108.

Figure 6:
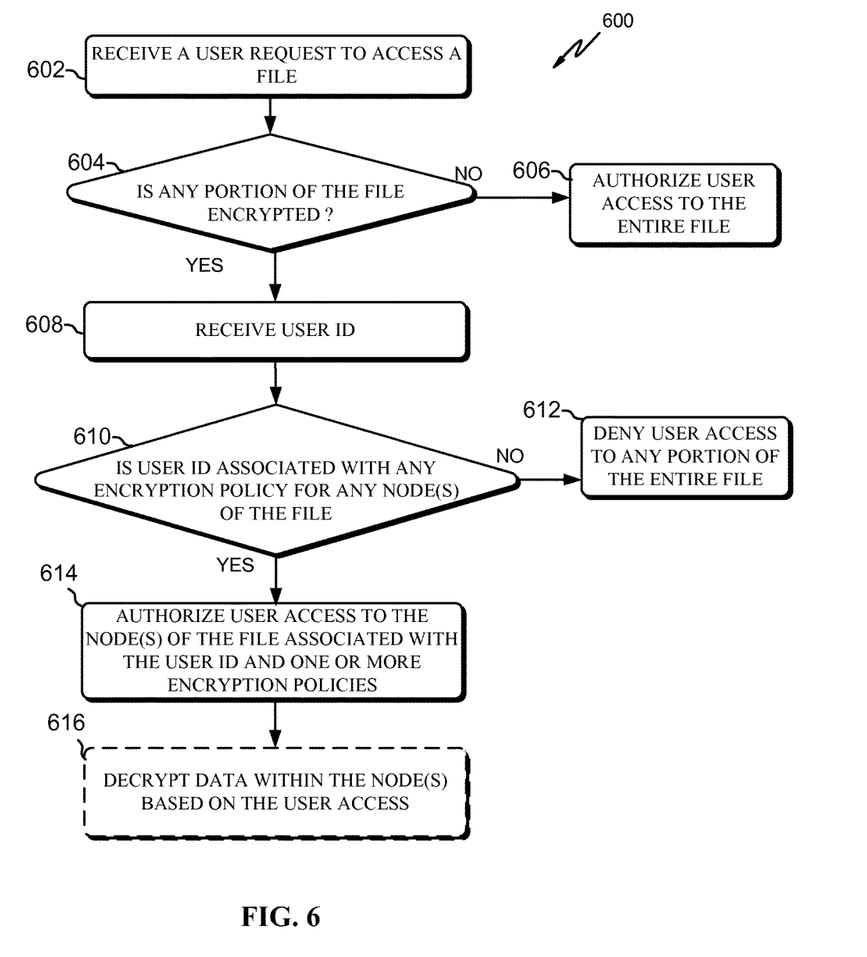
FIG. 6 is a flow diagram of an example process for authenticating a user request for a file, according to embodiments.

Consistent with some embodiments, the client computing device 102, and/or the server computing device 112 may be configured the same or analogous to the computing device 700, as illustrated in FIG. 6. In some computing environments, more or fewer servers may be present than computing environment 100 illustrated in FIG. 1 to perform various embodiments. In some embodiments, each of the data stores (i.e., data files 120, user information data store 124, and policies and rules data store 126) may be individual servers (e.g., database servers).

The client computing device 102 and/or the server computing device 112 may communicate with another via any suitable network 108. For example, the network 108 may be a local area network (LAN), a general wide area network (WAN), and/or a public network (e.g., the Internet).

The server computing device 112 may be any suitable servers consistent with embodiments of the present disclosure. For example, the server computing device 112 may be physically configured as a blade server, rack server, a cloud server, etc. Types of server hosting may include shared, virtual, clustered (e.g., Network Attached Clustered Storage Systems), and cloud systems or any other hosting. Server application types may include web servers (e.g., Apache web servers), application servers, specialized servers such as file, printer and database servers (e.g., MySQL servers), media and mail servers, etc. As illustrated in FIG. 1, the server computing device 112 in some embodiments may include a file manager 114 and cryptosystem 116, which may be stored as program instructions. In some embodiments, the file manager 114 may be a database manager configured to interface with the data files 120. As described in more detail below, the file manager 114 may parse a file into a plurality of nodes, associate one or more encryption policies with each of the plurality of nodes, and encrypt based on the association. The cryptosystem 116 may include a keying system for encrypting and/or decrypting data according to the different encryption policies and may include an encryption engine for providing various cipher text algorithms, as described in more detail below. The Client computing device 102 may also include its own cryptosystem 104 for key exchanging and encryption for authentication, as described in more detail below.

The data files 120 may be any data file type consistent with various file systems that contain either structured or unstructured data. For example, the data files may be archived and compressed files (e.g., zip files), recordable media files (e.g., files stored on DVD), Computer-Aided Design (CAD) files (e.g., AMF files), database files, document files (e.g., PDF files), etc. The file systems may be disk file systems, flash file systems, tape file systems, virtual file systems, network file systems, shared disk file systems, flat file systems, or any other file system consistent with various operating systems. In some embodiments, the data files 120 may include metadata blocks that store security keying (e.g., encryption key) information for each node that has a different encryption policy. In some embodiments, the keying information is stored in a dedicated data store or on a separate server computing device.

The policies and rules data store 126 may include each of the encryption policies that are associated with particular nodes. For example, the policies and rules data store 126 may store information that specifies that only particular users may be authorized to access a first node (e.g., a column). The policies and rules data store 126 is discussed in more detail below. The policies and ruled data store 126 may also store various security keys associated with each of the policies for a particular node of a file. In some embodiments, the security keys may be stored to a key store dedicated to storing security keys.

The user information data store 124 may store information concerning various users. For example, the user information data store 124 may include an ID corresponding to each user allowed to have access to a file, usernames, user passwords, or other authentication and authorization information. The user information data store 124 may be utilized by the server computing device 112 to associate a particular user ID to an encryption policy, as described in more detail below.

Figure 2:
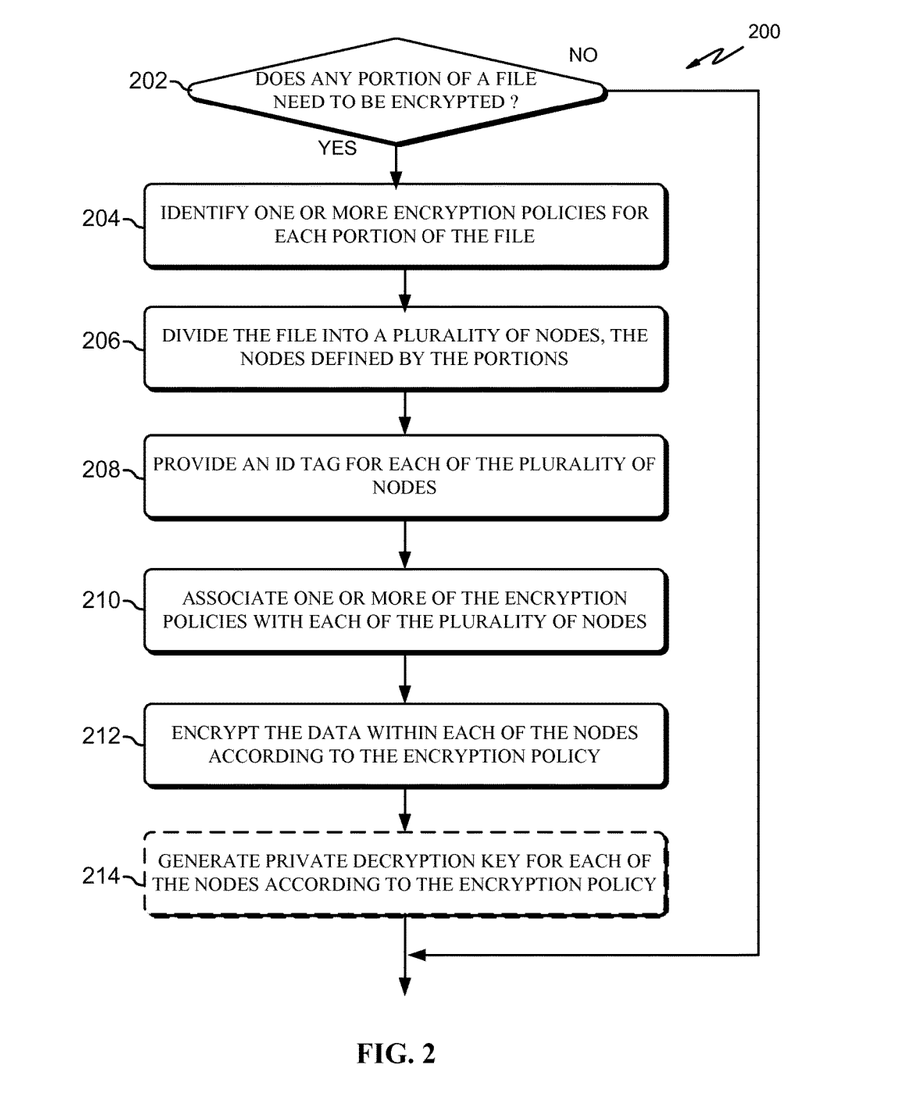
FIG. 2 is a flow diagram of an example process for parsing a file into a plurality of nodes and associating one or more encryption policies with each of the plurality of nodes, according to embodiments.

FIG. 2 is a flow diagram of an example process for parsing a file into a plurality of nodes and associating one or more encryption policies with each of the plurality of nodes, according to embodiments. It is to be understood that the order in which the blocks described below are discussed is not to be construed as limiting the order in which the individual acts may be performed. In particular, the acts performed may be performed simultaneously or in a different order than that discussed. For example, block 208 may be performed after block 210.

In some embodiments, the process 200 may begin at block 202 when a file manager determines whether any portion of a file needs to be encrypted. Some files' entire data profile may be public information or not sensitive and therefore require no encryption policy. Accordingly, the file manager may determine that no portion of the file needs to be encrypted. If no portion of the file needs to be encrypted then the process 200 may end. The file manager may determine whether any portion of the file needs to be encrypted based one whether one or more encryption policies need to be applied to the file. The encryption policies may be set by a computing system or a user. The file manager may determine whether any portion of the file needs to be encrypted by identifying a file type of a file (e.g., within a superblock) and encrypting one or more portions of a file based on the identity. For example, particular files or portions of files may need to be encrypted such as sensitive business files (e.g., financial files, trades secret files), government files, etc. Other files, however, may not need to be encrypted at all such as public internet files.

Per block 204, if any portion of a file needs to be encrypted then the file manager may identify one or more encryption policies for each portion of the file. An encryption policy, in some embodiments, is a particular security policy that is unique or tailored to specific users for authentication purposes such that only particular users may access portions of authorized data. A particular encryption policy may include a unique security key for decrypting associated data and/or encryption algorithm for encrypting associated data. For example, a security key associated with a first node may only decrypt data within the first node and not decrypt other nodes, as described in more detail below. In some embodiments, an encryption policy for a specific portion may specify that no data is to be encrypted for that portion. In an embodiment, a file may be a database file, and a "portion" may include records (i.e. rows), columns (i.e. attributes), fields, or values within a data block. Therefore, for example, the file manager may identify an encryption policy for each column of a file. In an illustrative example, the file manager may identify a first encryption policy for a first set of records that only a first group of users may access. The file manager may then identify a second encryption policy for a second set of records that only a second group of users may access. The file manager may identify the one or more encryption policies in various manners. For example, the file manager may receive a user request that specifies what the encryption policies are for each portion. Alternatively, the file manager may generate default encryption policies without a user request (e.g., via the policies and rules data store 126 and user information data store 124 of FIG. 1).

Per block 206, the file manager may parse (e.g., logically divide, split, etc.) the file into a plurality of nodes. The nodes may be defined by the portions. The term "nodes" in some embodiments means logical partitions of a file such as a set of columns, records, fields, values, etc. For example, using the illustration above, after the file manager identifies the first encryption policy for a first set of records and the second encryption policy for the second set of records, the file manager may parse the file into the first set of records and the second set of records such that a logical boundary is formed between the first set of records and the second set of records. In some embodiments, the nodes may be a logical indicator according to the file type. For example, a file may be a Moving Picture Experts Group (MPEG) video file. The nodes may define different scenes of a video, which corresponds to a timestamp or snapshot of a video instance. Per block 208, the file manager may provide an ID tag for each of the plurality of nodes. An ID tag may be an identifier for each node such that the node itself may be able to be accessed by the file manager and/or requested by a user. The ID tag may be utilized by a computing device to link one or more encryption policies to one or more nodes of the plurality of nodes, as described in more detail below. In an example illustration, a first node of 5 columns of a database table may include an ID tag of 1, a second node of 10 columns may include an ID tag of 2, etc.

Per block 210, the file manager may associate one or more of the encryption policies with each of the plurality of nodes. In some embodiments, the file manager may perform block 210 by identifying the ID tag of each node and linking each tag to the encryption policy identified in block 204. Block 210 may be performed so that when a user issues a request for data, the file manager may link an encryption policy and node to the request, as described in more detail below.

Per block 212, the file manager may encrypt the data within each of the nodes according to the encryption policy. Encryption is the process of converting ordinary text (i.e., plaintext), into a form that is unreadable (i.e., ciphertext). Decryption reverses the encryption process by translating ciphertext into plaintext. A cipher is an algorithm used to perform a particular type of encryption and decryption. A security key (e.g., public or private key) may be a set of particular parameters that guide the algorithm and encrypt or decrypt data. In some embodiments, the file manager may utilize a security key to encrypt the data within each of the nodes according to the encryption policy. Each node may include a respective security key that encrypts data according to a ciphertext algorithm. The ciphertext algorithm that the file manager utilizes may be any algorithm for particular embodiments. For example, the encryption algorithm may be an asymmetric algorithm type, such as a Ribest-Shamir-Adleman (RSA), Diffie-Hellman (DH), Pretty Good Privacy (PGP) or other algorithms. The asymmetric algorithm may be utilized with asymmetric keys. Asymmetric keys may include private and public security keys. Alternatively, the algorithm type may be a symmetric algorithm that is meant to be utilized with a symmetric key. The symmetric algorithm may be any number of algorithms such as triple Data Encryption Standard (DES), International Data Encryption Algorithm (IDEA), Advanced Encryption Standard (AES), or other algorithms. For a symmetric key algorithm, only one key is utilized to encrypt and decrypt tuple data.

Per block 214, and in some embodiments, the file manager may generate private decryption keys for each of the nodes according to the encryption policy. For example, the cryptosystem may include an asymmetric keying system. In these embodiments, a user computing device that issues a request for data may include a public key (e.g., via the cryptosystem 104 of FIG. 1) that encrypts the user's message to a server computing device that has access to data. The private key may be stored to the server computing device and when compared with the user's public key, the private key may decrypt the request message and the data that the user requests. In other embodiments, a symmetric security key may be generated for each of the nodes, as described in more detail below.

Figure 3:
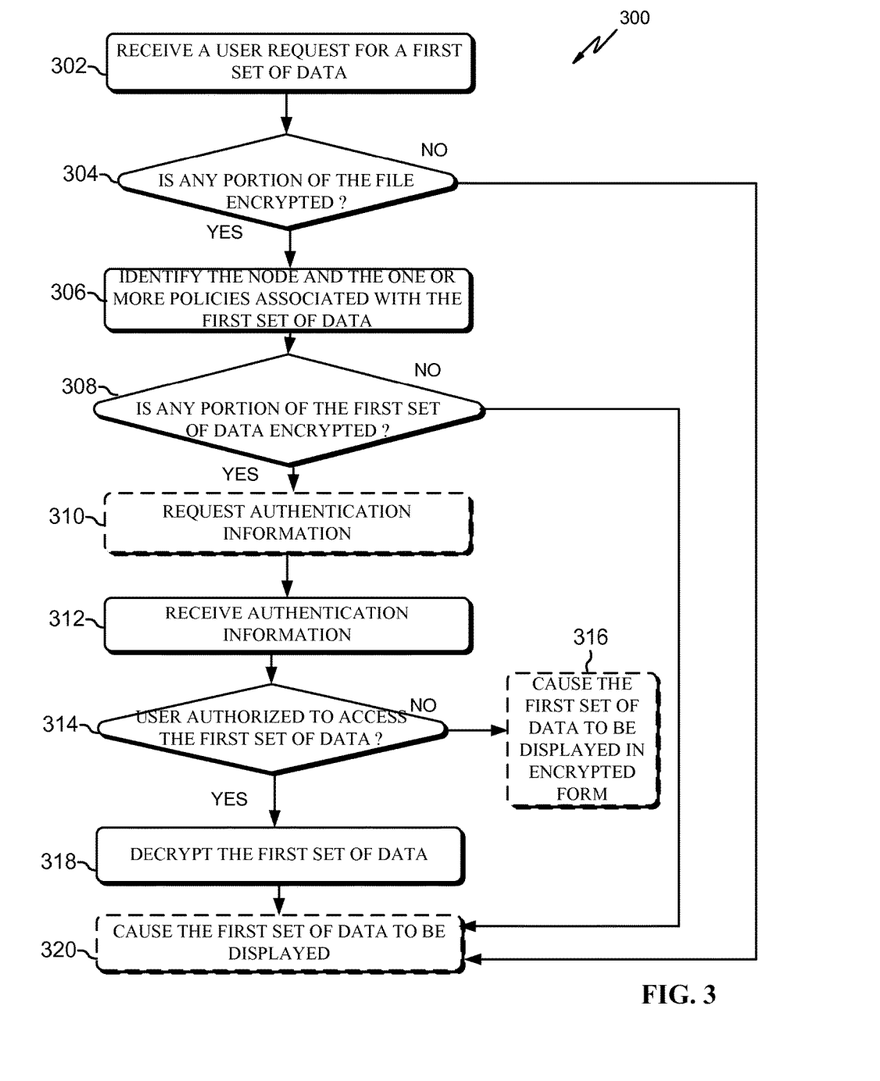
FIG. 3 is a flow diagram of an example process for authenticating a user request for data, according to embodiments.

FIG. 3 is a flow diagram of an example process 300 for authenticating a user request for data, according to embodiments. In some embodiments, the process 300 may begin at block 302 when a server computing device receives a user request for a first set (i.e., one or more) of data. For example, the user may request a first set of database records. In some examples, the user may request an entire file.

Per block 304, the server computing device (e.g., via a file manager) may determine whether any portion of the file that corresponds to the request is encrypted. In some embodiments, the server computing device performs block 304 by checking a metadata block (e.g., inode block) of the file that indicates whether any portion of the file is encrypted. In other embodiments, the server computing device may scan the file itself to determine whether any portion of the file is encrypted. If no portion of the file is encrypted, then per block 320, the server computing device may cause the first set of data to be displayed on a user or client computing device (i.e., the user has access to the first set of data). In some embodiments, however, data may not necessarily be displayed on a client computing device but rather the client computing device may utilize the data without displaying the data to a user. Accordingly, the server computing device may communicate the data to the client computing device.

Per block 306, if any portion of the file is encrypted then the server computing device (e.g., via the file manager) may identify the one or more nodes and the one or more policies associated with the first set of data. For example, the server computing device may receive the request for a first set of records. The first set of records may then be located by the server computing device and associated with a node ID tag (i.e., the first set of records may belong to a particular node that was parsed). The node may then be associated or linked to a particular encryption policy (e.g., within the policies and rules data store 126) that defines the node(s). For example, the first set of records may belong to a particular node and the particular node may be associated with a particular policy that specifies that only a CFO (associated with a particular user ID) may be authorized to view the particular node. In an example illustration, the server computing device may identify the node(s) and/or policy for the first set of data by scanning a policies and rules data store. The policies and rules data store may include one or more entries that includes the first set of records. The one or more entries may include a field that specifies the node ID that the first set of records correspond to and/or a field that specifies the rules or policies associated with the one or more nodes.

Per block 308, the file manager may determine whether any portion of the first set of data is encrypted. If no portion of the first set of data is encrypted, then per block 320 the file manager may cause the first set of data to be displayed. As discussed above, the first set of data may not necessarily be displayed but communicated to a client device.

Per block 310, if any portion of the first set of data is encrypted then, in some embodiments, the server computing device may request authentication information from a client device and cause the client device to request authentication information from a user. In these embodiments, for example, the user may receive a notification from his client device that indicates that the data that the user requested is subject to a particular security policy and that the user must provide a username and/or password to have access to the requested data in a file. In some embodiments, however, block 310 may be performed at the beginning of process 300 such that a user may be requested to provide authentication information before a file is accessed. In yet other embodiments, block 310 may not be performed at all, as the server computing device that corresponds with the file manager may automatically receive authentication information for the user, as described in more detail below.

Per block 312, the server computing device associated with the file manager may receive authentication information from the user client device. Receiving authentication information from the user client device may occur in several different manners according to various embodiments. For example, as described above, the cryptosystem may include an asymmetric keying system. In some embodiments, the user's computing device may store a public key and an ID that is transmitted to and utilized by the server computing device's private key to decrypt the request if the public key matches the private key. The server computing device may check the ID and compare the ID to a set of policies associated with the ID (e.g., identify an ID within the user information data store 124 and check ID against the policies and rules data store 126 for that ID). For example, the ID may correspond to a CEO and the policy may specify that the CEO can view all columns in a database file.

In some embodiments, the asymmetric keying system may be a digital signature system. In these embodiments, the user may issue a request that is hashed. The hash may then be encrypted with the user's private key. The user's request, ID, and hash may then be transmitted over a network. The server computing device that receives the hash may decrypt the hash with the user's public key. The server computing device may then compare the hash with the message to determine whether there was any security tampering (e.g., whether someone eves dropped on the message). The server computing device may then associate the ID with the ID's encryption policy, and compare that encryption policy to the encryption policy associated with the user request.

In some embodiments, the user's computing device and the server computing device may share a symmetric key. In these embodiments, the user may transmit an ID and a request message, which is encrypted by the symmetric key before it is transmitted to the server computing device. The server computing device may authenticate by receiving the ID and decrypting the message with the shared symmetric key. In some embodiments, the server computing device may receive a password and username along with the user's request and associated the password and/or username with corresponding policies. In some embodiments, a Public Key Infrastructure (PKI) authentication system may be utilized.

Per block 314, a server computing device may determine whether the particular user is authorized to access or view the first set of data (e.g., via the keying methods described above). Per block 316 and in some embodiments, if the user is not authorized to access the first set of data, the server computing device may still cause the first set of data to be displayed but in an encrypted form because the user may not be authorized to view or access the data. In some embodiments, if the user is not authorized to access the first set of data, block 310 may be repeated such that the user is prompted to again provide authentication information. In these embodiments, a lockout mechanism may be utilized to provide the user the opportunity to provide the correct authentication information within a particular threshold quantity of attempts (e.g., 3 attempts). In some embodiments, a user may request an entire file and while the first set of data may be displayed in an encrypted manner, other sets of data may be displayed in a decrypted manner because the user may be authorized to view other portions of the file. Accordingly, after the user requests a particular file, various decrypted portions along with encrypted portions of the file may be displayed according to the encryption policy. In some embodiments, if the user is not authorized to access the first set of data, then the user client device may simply not be able to access the data or communicate with the server computing device.

Per block 318, if the user is authorized to access the first set of data then the server computing device (or user computing device) may decrypt the first set of data (e.g., via any keying systems as described above). Per block 320, the server computing device may cause the decrypted first set of data to be displayed to the user computing device. In some embodiments, the server computing device may decrypt the first set of data within the file and transmit the decrypted first set of data over a network to the user computing device such that the user computing device displays the first set of data. Alternatively, the server computing device may keep the data encrypted until it arrives at the user computing device at which point the user computing device key may decrypt the data. In other embodiments, the server computing device may establish a separate encryption connection (e.g., a Security Sockets Layer (SSL) connection) such that even though data was decrypted by the server computing device within the file, it may be encrypted again in preparation for data transmission such that an unauthorized user may not eves drop or intercept unencrypted communication.

Figure 4A:
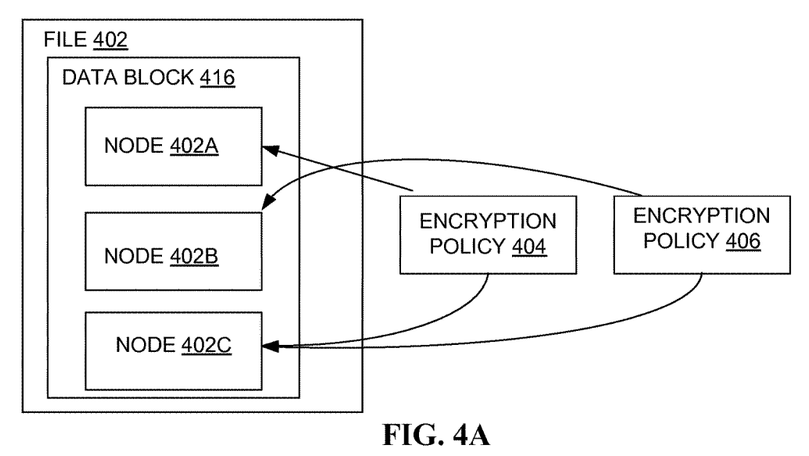
FIG. 4A is a block diagram of a file showing how each node of the file relates to a given encryption policy.

FIG. 4A is a block diagram of a file 402 showing how each node of the file relates to a given encryption policy. The file 402 may include a plurality of blocks (e.g., data blocks, super block, inode block, etc.). The data block 416 may be parsed into a plurality of nodes 402A, 402B, and 402C. As illustrated by the arrows, each node may be associated with one or more encryption policies. For example, node 402A is associated with encryption policy 404. Node 402B is alternatively associated with encryption policy 406. Further, Node 402C is associated with both policy 404 and 406. For example, encryption policy 404 may correspond to managers being able to view data within nodes 402A and 402C. Encryption policy 406 may correspond to accountants being able to view data within node 402B and 402C.

Figure 4B:
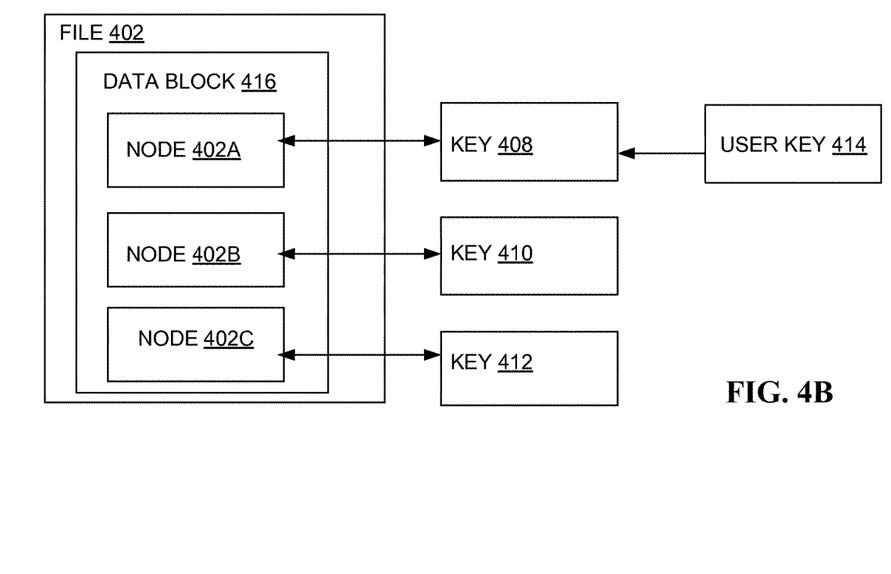
FIG. 4B is a block diagram of the file of FIG. 4A and a key map according to the encryption policies of FIG. 4A.

FIG. 4B is a block diagram of the file 402 of FIG. 4A and a security key map according to the encryption policies of FIG. 4A. As illustrated in FIG. 4A and FIG. 4B, because node 402A is associated with policy 404, the file manager may generate a first security key 408 such that either a user with a symmetric shared security key (first key 408) or user security key 414 may be able to have access to the content or data within node 402A. For example, the keying system may be a public keying system and thus the user security key 414 may be a public key. In order to decrypt the data within node 402A, the first security key 408 may be a private key and the system that corresponds with the first security key 408 may need to receive the user key 414 before the first security key 408 decrypts the data within node 402A. Likewise, because node 402B is associated with encryption policy 406, a different second security key 410 may be generated in order for any users to be able to have access to the data within node 402B. Moreover, node 402C is associated with both encryption policies 404 and 406. Accordingly, for example a first user subject to the encryption policy 404 may utilize the security key 412 to decrypt the node 402C. A second user subject to the encryption policy 406 may also utilize the security key 412 to decrypt the node 402C. In some embodiments, and according to an example, a user may have access to data within both nodes 402A and 402B. Accordingly, the user security key 414 may combine or be associated with the first key 408 and the second key 410 such that when the user security key 414 is presented, both nodes 402A and 402B will be decrypted and displayed to the user. In some embodiments, both of the keys 410 and 412 may be combined to decrypt the data within nodes 402B and 402C for those users who have access to both of the nodes 402B and 402C. To "combine" two or more security keys may mean that a new security key may be generated that is the length of the combined keys. For example, if a first security key is combined with a second security key, the first and second security key may be merged to form a third security key, which is the length of the first and second security key. In these embodiments, the third security key may be utilized to decrypt any of the nodes corresponding to the first or second security key because the third security key includes both the first and second security keys.

Figure 5:
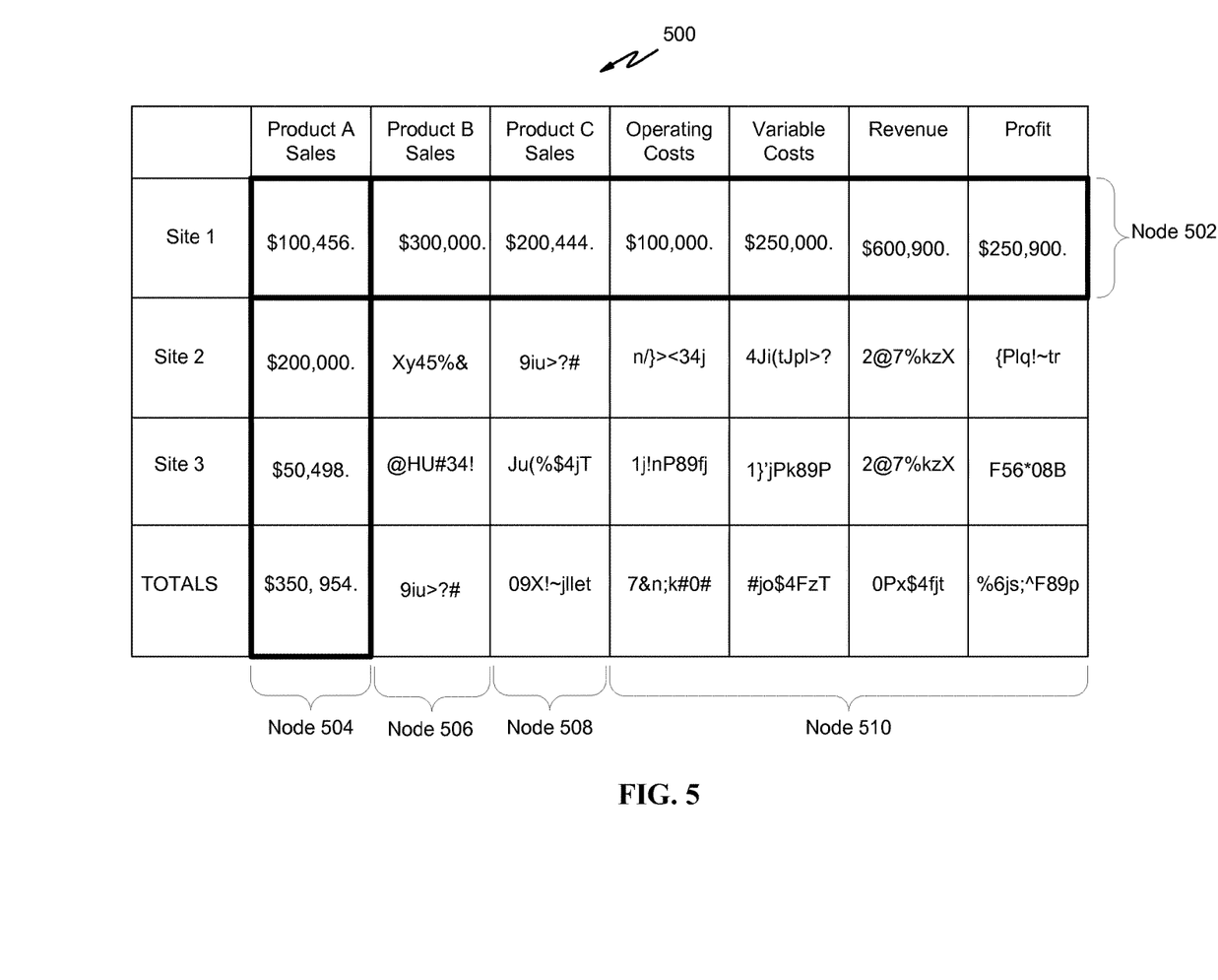
FIG. 5 is a diagram of an example data table of a file that is parsed into a plurality of nodes, according to embodiments.

FIG. 5 is a diagram of an example data table 500 of a file that is parsed into a plurality of nodes, according to embodiments. The data table 500 may include a plurality of columns, such as Product A sales, Product B sales, Product C sales, Operating Costs, Variable Costs, Revenue, and Profit. The data table 500 may also include various records, such as records that correspond to Site 1, Site 2, Site 3, and a TOTALS record. The data table 500 may also be parsed into a plurality of nodes such as node 502 (corresponding to site 1 record), node 504 (corresponding to Product A sales column), node 506 (corresponding to Product B sales column), node 508 (corresponding to Product C Sales column) and node 510 (corresponding to all of the columns of Operating Costs, Variable Costs, Revenue, and Profit).

The data layout in FIG. 5 may be illustrative of the manner in which a particular user may view or have access to file data according to the encryption policy that the user is associated with. For example, a manager of Site 1 may request to view the data table 500. As outlined in the thick dark lines, an encryption policy may specify that the manager of Site 1 may view both nodes 502 and 504. Accordingly, and in some embodiments, each of the values within the product A sales column—$100,456, $200,000, $50,498, and $350,954 may be viewable by the Site 1 manager. Further each of the values within the Site 1 record may be viewable by the Site 1 manager—$100,456, $300,000, $200, 444, $100,000, $250,000, $600,900, and $250,900. The rest of the values for each of the columns and rows may be encrypted because the Site 1 manager may not be authorized to view the other data. In some embodiments as illustrated in FIG. 5, a node may include various data objects combined such as various columns that define node 510. Node 510 may be illustrative, for example, for a policy that specifies that a CEO, CFO, or other board member may view all of the important financial data needed for an overall business assessment.

FIG. 6 is a flow diagram of an example process 600 for authenticating a user request for a file, according to embodiments. The process 600 in some embodiments begins at block 602 when a computing device receives a user request to access a file. Per block 604, the computing device may determine whether any portion of the file is encrypted. As discussed above, the computing device may determine whether any portion of the file is encrypted by scanning one or more blocks of the file, such as a superblock (or inode block) which may include metadata concerning whether any portion of the file is encrypted. The computing device may also scan the data blocks to determine whether any portion of the file is encrypted. If no portion of the file is encrypted, then per block 606, the computing device may authorize user access to the entire file. Per block 608, if any portion of the file is encrypted then the computing device may receive a user ID corresponding to an identification of the user that sent the request for the file in block 602. In some embodiments, the user ID may be transmitted to the computing device from a user computing device along with or as part of a user security key. In some embodiments, the user ID is a security key. As discussed above, the security key may be a part of a symmetric keying system, an asymmetric keying system, or any other suitable keying system. In some embodiments, the user security key includes a user ID. In some embodiments, the user ID may be transmitted to the computing device without a user security key. In particular embodiments, the computing device may first receive a separate ID of a user and if the computing device associates the ID with a particular encryption policy and security key to decrypt a particular set of data, the computing device may then transmit the corresponding security key and data to the user computing device such that the security key within the user computing device may decrypt the data.

Per block 610, the computing device may determine whether the user ID is associated with any encryption policy for one or more nodes of the file. For example, the computing device may search a data store (e.g., user information data store 124 of FIG. 1) and search for an entry that includes the ID that the computing device received when the computing device received the user security key. If the ID is not found within the data store, then the user ID may not be associated with any encryption policy for any nodes of the file. Accordingly, per block 612, the computing device may deny user access to any portion of the file. Conversely, if the ID is found within and entry of the data store, the entry may also include each node of the file that the ID may have access to according to an encryption policy. For example, the ID may correspond to a Chief Financial Officer (CFO) and an encryption policy may specify that the CFO can view any financial data file. Accordingly, the entry within the data store may include each of the nodes within the file that include financial data such that those nodes may be decrypted for user access, as discussed below.

Per block 614, the computing device may authorize user access to data within the node(s) of the file that are associated with the user ID and one or more encryption policies. Per block 616, and in some embodiments, if the user ID is associated with any encryption policy for any node(s) of the file (the user is authorized for access), then the computing device security key may decrypt the data within the node(s) based on the user ID and one or more encryption policies. For example, the computing device (or user computing device) may store its own set of security keys for decrypting data within any particular node according to an encryption policy.

If each node of a file is associated with a security key for decryption and a user is authorized to access most of the nodes according to an encryption policy, then each of the security keys may be combined for a particular user such that the user may have access most of the nodes. For example, a file may include 4 nodes and each node may be associated with a particular key to decrypt the data within the respective node. In some embodiments, if a particular user was allowed access to 3 of the 4 nodes, then the computing device may transmit 3 of the 4 keys to the user computing device such that the user computing device may decrypt 3 of the 4 nodes. Accordingly, the computing device may cause a computing device of the first user to decrypt the data. After the data has been decrypted per block 616, the computing device (or user computing device) may cause a user computing device to display data in plain text form such that the user is able to view the data. In another example, the data may simply be transmitted to the user computing device such that the user computing device may utilize the data without necessarily displaying the data to a user.

Figure 7:
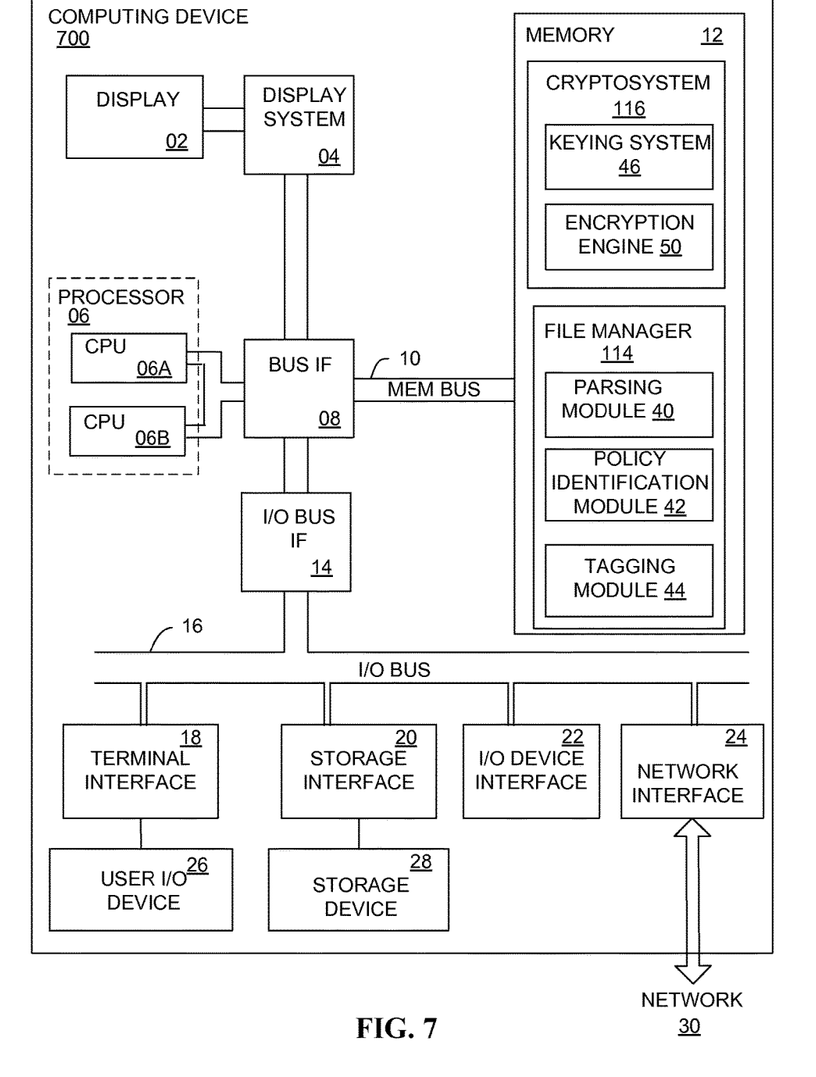
FIG. 7 is a block diagram of a computing device that includes a cryptosystem and a file manager.

FIG. 7 is a block diagram of a computing device 700 that includes a cryptosystem 116 and a file manager 114. The components of the computing device 700 can include one or more processors 06, a memory 12, a terminal interface 18, a storage interface 20, an Input/Output ("I/O") device interface 22, and a network interface 24, all of which are communicatively coupled, directly or indirectly, for inter-component communication via a memory bus 10, an I/O bus 16, bus interface unit ("IF") 08, and an I/O bus interface unit 14.

The computing device 700 may include one or more general-purpose programmable central processing units (CPUs) 06A and 06B, herein generically referred to as the processor 06. In an embodiment, the computing device 700 may contain multiple processors; however, in another embodiment, the computing device 700 may alternatively be a single CPU device. Each processor 06 executes instructions stored in the memory 12 (e.g., the cryptosystem 116 and the file manager 114 instructions).

The computing device 700 may include a bus interface unit 08 to handle communications among the processor 06, the memory 12, the display system 04, and the I/O bus interface unit 14. The I/O bus interface unit 14 may be coupled with the I/O bus 16 for transferring data to and from the various I/O units. The I/O bus interface unit 14 may communicate with multiple I/O interface units 18, 20, 22, and 24, which are also known as I/O processors (IOPs) or I/O adapters (IOAs), through the I/O bus 16. The display system 04 may include a display controller, a display memory, or both. The display controller may provide video, audio, or both types of data to a display device 02. The display memory may be a dedicated memory for buffering video data. The display system 04 may be coupled with a display device 02, such as a standalone display screen, computer monitor, television, a tablet or handheld device display, or another other displayable device. In an embodiment, the display device 02 may include one or more speakers for rendering audio. Alternatively, one or more speakers for rendering audio may be coupled with an I/O interface unit. In alternate embodiments, one or more functions provided by the display system 04 may be on board an integrated circuit that also includes the processor 06. In addition, one or more of the functions provided by the bus interface unit 08 may be on board an integrated circuit that also includes the processor 06.

The I/O interface units support communication with a variety of storage and I/O devices. For example, the terminal interface unit 18 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 26 and the computing device 700, may receive output data via the user output devices. For example, a user interface may be presented via the user I/O device 26, such as displayed on a display device, played via a speaker, or printed via a printer.

The storage interface 20 supports the attachment of one or more disk drives or direct access storage devices 28 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 28 may be implemented via any type of secondary storage device. The contents of the memory 12, or any portion thereof, may be stored to and retrieved from the storage device 28 as needed. The I/O device interface 22 provides an interface to any of various other I/O devices or devices of other types, such as printers or fax machines. The network interface 24 provides one or more communication paths from the computing device 700 to other digital devices and computer systems.

Although the computing device 700 shown in FIG. 7 illustrates a particular bus structure providing a direct communication path among the processors 06, the memory 12, the bus interface 08, the display system 04, and the I/O bus interface unit 14, in alternative embodiments the computing device 700 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 14 and the I/O bus 08 are shown as single respective units, the computing device 700, may include multiple I/O bus interface units 14 and/or multiple I/O buses 16. While multiple I/O interface units are shown, which separate the I/O bus 16 from various communication paths running to the various I/O devices, in other embodiments, some or all of the I/O devices are connected directly to one or more system I/O buses.

In various embodiments, the computing device 700 is a multi-user mainframe computer system, a single-user system, or a server computer or similar device that has little or no direct user interface, but receives requests from other computer systems (clients). In other embodiments, the computing device 700 may be implemented as a desktop computer, portable computer, laptop or notebook computer, tablet computer, pocket computer, telephone, smart phone, or any other suitable type of electronic device. The computing device 700 may be the client computing device 102 of FIG. 1 and/or the server computing device 112 of FIG. 1.

In an embodiment, the memory 12 may include a random-access semiconductor memory, storage device, or storage medium (either volatile or non-volatile) for storing or encoding data and programs. In another embodiment, the memory 12 represents the entire virtual memory of the computing device 700, and may also include the virtual memory of other computer systems coupled to the computing device 700 or connected via a network 30. The memory 12 may be a single monolithic entity, but in other embodiments the memory 12 may include a hierarchy of caches and other memory devices. For example, memory may exist in multiple levels of caches, and these caches may be further divided by function, so that one cache holds instructions while another holds non-instruction data, which is used by the processor. Memory 12 may be further distributed and associated with different CPUs or sets of CPUs, as is known in any various so-called non-uniform memory access (NUMA) computer architectures.

The memory 12 may store all or a portion of the components and data shown in FIG. 7. These programs and data are illustrated in FIG. 7 as being included within the memory 12 in the computing device 700; however, in other embodiments, some or all of them may be on different computer systems and may be accessed remotely, e.g., via a network 30. The computing device 700 may use virtual addressing mechanisms that allow the programs of the computing device 700 to behave as if they only have access to a large, single storage entity instead of access to multiple, smaller storage entities. Thus, while the components and data shown in FIG. 7 are illustrated as being included within the memory 12, these components and data are not necessarily all completely contained in the same storage device at the same time. Although the components and data shown in FIG. 7 are illustrated as being separate entities, in other embodiments some of them, portions of some of them, or all of them may be packaged together.

In some embodiments, the memory 12 may include program instructions or modules, such as the cryptosystem 116 of FIG. 1 and/or the file manager 114 of FIG. 1. The cryptosystem 116 in some embodiments may include a keying system 46 and an encryption engine 50. The keying system 46 may include various keying systems, such as symmetric, asymmetric, digital signature, or any other keying systems for encrypting and/or decrypting data according to various encryption policies. The encryption engine 50 may utilize any encryption algorithm. For example, the algorithm may be an asymmetric algorithm type, such as RSA, DH, PGP or other algorithms. The asymmetric algorithm may be utilized with asymmetric keys. In an alternative embodiment, the algorithm type may be a symmetric algorithm that is meant to be utilized with a symmetric key. The symmetric algorithm may be any number of algorithms such as triple DES, IDEA, AES, or other algorithms.

The file manager 114 may include a parsing module 40, a policy identification module 42 and a tagging module 44. The parsing module 40 may parse a file into a plurality of nodes, as described above. The policy identification module 42 may identify, generate, and/or associate one or more encryption policies with each of the plurality of nodes, as described above. The tagging module 44 may generate an ID tag for each of the plurality of nodes in response to the parsing, as described above.

In an embodiment, the components and data shown in FIG. 7 (e.g., cryptosystem 116 and/or file manager 114) may include instructions or statements that execute on the processor 06 or instructions or statements that are interpreted by instructions or statements that execute on the processor 06 to carry out the functions as further described below. In another embodiment, the components shown in FIG. 7 may be implemented in hardware via semiconductor devices, chips, logical gates, circuits, circuit cards, and/or other physical hardware devices in lieu of, or in addition to, a processor-based system. In an embodiment, the components shown in FIG. 6 may include data in addition to instructions or statements.

FIG. 7 is intended to depict representative components of the computing device 700. Individual components, however, may have greater complexity than represented in FIG. 7. In FIG. 7, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 7 may be implemented, in various embodiments, in a number of different ways, including using various computer applications, routines, components, programs, objects, modules, data pages etc., which may be referred to herein as "software," "computer programs," or simply "programs."

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for providing encryption policies for various portions of a file in a file system, the method comprising:

parsing, by a computing device, a file into a plurality of nodes, the file being organized into one or more inode blocks, one or more data blocks, and a super-block;

the one or more inode blocks includes:
information about a size of the file, one or more timestamps, one or more pointers to where data is in the one or more data blocks, which node of the plurality of nodes a data block is associated with, and security key information of an encryption policy associated with each node of the plurality of nodes;

the superblock includes:
information about how many of the one or more inode blocks and the one or more data blocks are in the file,
where the one or more inode blocks and the one or more data blocks begin,
and an identifier to identify a type of the file;

each node of the plurality of nodes is defined by two or more of the one or more data blocks, and the one or more inode blocks, the plurality of nodes being associated with a first database table of the file, a first node of the plurality of nodes is defined by a logical boundary that groups a first set of database records of the first database table of the file and does not group a second set of database records of the first database table of the file, a second node of the plurality of nodes is defined by a second logical boundary that groups a first plurality of database columns of the first database table of the file and does not group a second plurality of database columns of the first database table of the file;

associating, based on the security key information in the one or more inode blocks by the computing device, at least a first encryption policy with the first node of the plurality of nodes;

associating, based on the security key information in the one or more inode blocks by the computing device, at least a second encryption policy with the second node of the plurality of nodes;

encrypting, based on the associating the at least the first encryption policy with the first node, data within the first node;

encrypting, based on the associating the at least the second encryption policy with the second node, data within the second node;

receiving a first request from a first user to access the file;

receiving a user security key from the first user, the user security key for use in decrypting a particular set of data within at least one of the plurality of nodes;

receiving a first identifier (ID) associated with the first user, the first ID corresponding to a particular work title of the first user;

determining that the user security key and the first ID are associated with the first node and the first encryption policy;

determining, based on the determining that the user security key and the first ID are associated with the first node and the first encryption policy, that the first user is authorized to access the first set of database records of the first database table of the file within the first node; and in response to the determining that the first user is authorized to access the first set of database records of the first database table of the file within the first node, decrypting the first set of database records using the user security key; and wherein the parsing the file into the plurality of nodes is carried out after a file manager determines that a first portion and a second portion of the file need to be encrypted by identifying the file type of the file within the superblock of the file, and wherein the first portion corresponds to the first node and the second portion corresponds to the second node.

2. The method of claim 1, further comprising generating, in response to the parsing by the computing device, an identification (ID) tag for each of the plurality of nodes, the ID tag corresponding to a node identifier for the computing device to link one or more encryption policies to one or more nodes of the plurality of nodes.

3. The method of claim 1, wherein each of the plurality of nodes includes a different encryption policy.

4. The method of claim 3, further comprising generating a different security key for each of the plurality of nodes, wherein the different security key for a particular node of the plurality of nodes decrypts data within the particular node of the plurality of nodes.

5. The method of claim 1, further comprising:
receiving a second user request from a second user to access the file;
receiving a second user security key from the second user, the second user security key for use in decrypting a particular set of data within at least one of the plurality of nodes;
receiving a second identifier (ID) associated with the second user, the second ID corresponding to a particular work title of the second user;
determining that the second user security key and the second ID are associated with the second node and the second encryption policy;
determining, based on the determining that the second user security key and the second ID are associated with the second node and the second encryption policy, that the second user is authorized to access the first plurality of database columns of the first database table of the file within the second node; and
in response to the determining that the second user is authorized to access the first plurality of database columns within the second node, decrypting the first plurality of database columns using the second user security key.

6. The method of claim 1, wherein the first node including an inode block that references a first set of data blocks, and the first node further including a superblock.

7. The method of claim 1, wherein the first encryption policy is based on whether a particular user is permitted to access trade secret data of a business within the first node, and the second encryption policy is based on whether the particular user is permitted to access financial data of the business within the second node.

8. The method of claim 1, further comprising determining, in response to the receiving of the first user request and prior to the determining that the user security key and the first ID are associated with the first node, that a portion of the file is encrypted by checking the one or more inode blocks of the file, the one or more inode blocks indicating what portion of the file is encrypted.

9. A system for providing encryption policies for various portions of a file, the system comprising:
a first computing device having a processor; and
a non-transitory computer readable storage medium having program instructions embodied therewith, the program instructions executable by the processor to cause the system to:
parse the file into a plurality of nodes, the file being organized into one or more inode blocks, one or more data blocks, and a super-block;
the one or more inode blocks includes:
information about a size of the file, one or more timestamps, one or more pointers to where data is in the one or more data blocks, which node of the plurality of nodes a data block is associated with, and security key information of an encryption policy associated with each node of the plurality of nodes;
the superblock includes:
information about how many of the one or more inode blocks and the one or more data blocks are in the file,
where the one or more inode blocks and the one or more data blocks begin,
and an identifier to identify a type of the file system;
each node of the plurality of nodes is defined by two or more of the one or more data blocks, and the one or more inode blocks, the plurality of nodes being associated with a first database table of the file, a first node of the plurality of nodes is defined by a logical boundary that groups a first set of database records of the first database table of the file and does not group a second set of database records of the first database table of the file, a second node of the plurality of nodes is defined by a second logical boundary that groups a first plurality of database columns of the first database table of the file and does not group a second plurality of database columns of the first database table of the file;
associate, based on the parsing, at least a first encryption policy with the first node of the plurality of nodes, wherein a first user is authorized to only access to the first set of database records of the first database table;
associate, based on the parsing, at least a second encryption policy with the second node of the plurality of nodes, wherein a second user is authorized to only access to the first plurality of database columns of the first database table;
generate a plurality of security keys for each of the plurality of nodes, the plurality of security keys for use in encrypting each of the plurality of nodes;
encrypt, by a first security key of the plurality of security keys and based on the associating the at least the first encryption policy with the first node, the first set of database records;
encrypt, by a second security key of the plurality of security keys and based on the associating the at least the second encryption policy with the second node, the first plurality of database columns;
receive a first request from the first user to access the file;
receive a user security key from the first user, the user security key for use in decrypting a particular set of data within at least one of the plurality of nodes;

receive a first identifier (ID) associated with the first user, the first ID corresponding to a particular work title of the first user;

determine that the user security key and the first ID are associated with the first node and the first encryption policy;

determine, based on the determining that the user security key and the first ID are associated with the first node and the first encryption policy, that the first user is authorized to access the first set of database records within the first node; and in response to the determining that the first user is authorized to access the first set of database records within the first node, decrypting the first set of database records using the user security key; and wherein the parse the file into the plurality of nodes is carried out after a file manager determines that a first portion and a second portion of the file need to be encrypted by identifying the file type of the file within the superblock of the file, and wherein the first portion corresponds to the first node and the second portion corresponds to the second node.

10. The system of claim 9, wherein the plurality of security keys include a different set of asymmetric security keys for each of the plurality of nodes, wherein a first security key of the different set of asymmetric security keys for a particular node of the plurality of nodes encrypts data within the particular node of the plurality of nodes, and a second key on a client device decrypts data within the particular node.

11. The system of claim 9, wherein the program instructions executable by the processor further cause the system to:

receive a second request from the second user to access the file;

receive a second ID associated with the second user, the second ID corresponding to a particular work title of the second user;

determine that the second ID is associated with the second node and the second encryption policy;

determine, based on the determining that the second ID is associated with the second node and the second encryption policy, that the second user is authorized to access the first plurality of database columns within the second node; and in response to the determining that the second user is authorized to access the first plurality of database columns within the second node, decrypting the first plurality of database columns with the second security key.

* * * * *